Jan. 17, 1961  B. OMOTO  2,968,206
INNER TUBE VALVE HOLDER
Filed July 23, 1957

INVENTOR.
BUNNOSUKE OMOTO
BY
Carl Miller
ATTORNEY

United States Patent Office 2,968,206
Patented Jan. 17, 1961

2,968,206
INNER TUBE VALVE HOLDER

Bunnosuke Omoto, Los Angeles, Calif.
(150 Orange Blossom Ave., La Puente, Calif.)

Filed July 23, 1957, Ser. No. 673,713

1 Claim. (Cl. 85—32)

This invention relates to automotive equipment and, more particularly, to a positioning tool for inner tube valves.

Ordinarily, it is awkward and somewhat inconvenient to attempt to hold the valve stem of automobile tire inner tubes while the tube is being inflated. As a result, a substantial amount of time is wasted in attempting to accomplish an otherwise simple task.

It is therefore an object of the present invention to provide a tire valve positioning tool that is simple in construction, efficient in operation, and which will overcome the aforementioned difficulties.

Another object of the present invention is to provide a positioning tool for tire tube valves which can be manufactured in large quantities at relatively low cost, and which may be conveniently and readily used to support the valve stem of the inner tube in an operative position within the valve receiving opening of the automobile wheel while the tire is being inflated.

All of the foregoing and still further objects and advantages of this invention will become apparent from a study of the following specification, taken in connection with the accompanying drawing, wherein.

Figures 1, 2:
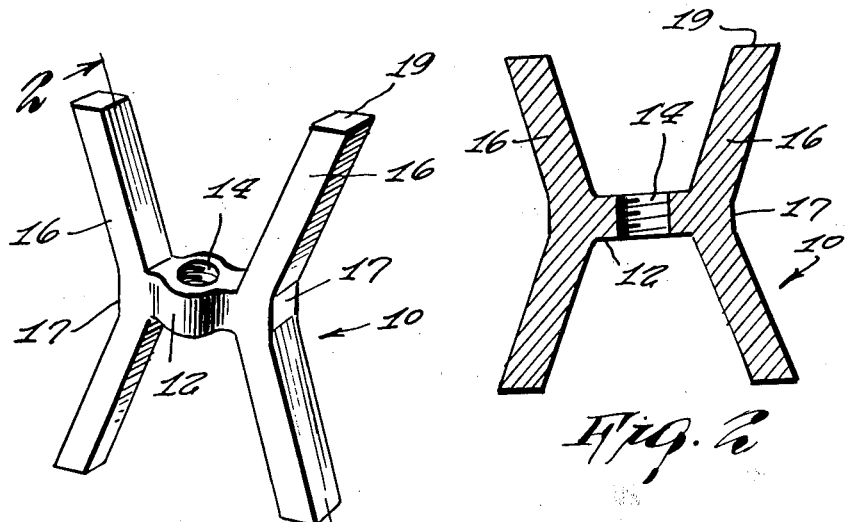
Figure 1 is a perspective view of a tire valve stem positioning tool made in accordance with the present invention.
Figure 2 is a longitudinal cross sectional view taken along line 2—2 of Figure 1.
Figure 4:
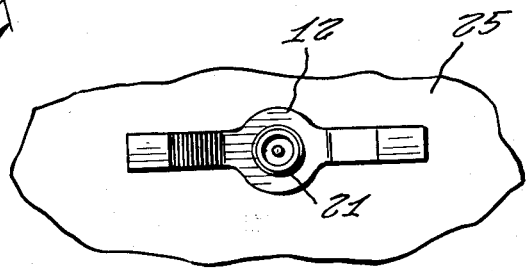
Figure 4 is a top plan view of the structure shown in Figure 3.
Figure 3:
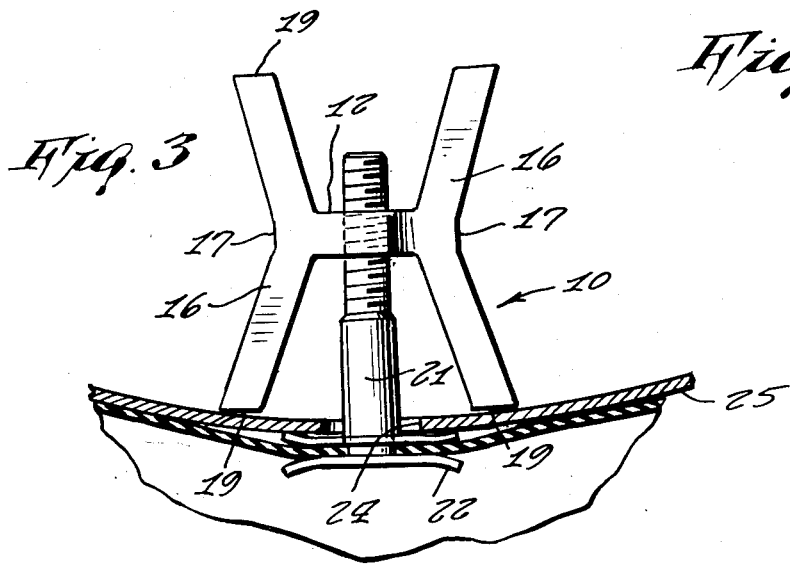
Figure 3 is a side elevational view of the tool in operative use.

Referring now to the drawing, and more particularly to Figures 1 and 2 thereof, a tire valve stem positioning tool 10 made in accordance with the present invention is shown to include a main body portion 12 of substantially circular configuration. A longitudinal threaded bore 14 extends through the main body member 12 for threadingly engaging with the valve stem to be positioned. A pair of V-shaped members 17 are secured to diametrically opposite sides of the main body portion 12 and symmetrically arranged therewith. Each V-shaped member includes a pair of inwardly converging arms 16 which have end surfaces 19 that lie in parallel planes, all of which planes are parallel to the central longitudinal plane of the main body portion 12 and perpendicular to the longitudinal axis of the bore 14.

In use, the tool 10 is rotated into threaded engagement with the valve stem 21 of an inner tube 22 that projects through an opening 24 in the circular peripheral flange of the wheel 25. As the tool is threaded into engagement with the valve stem 21 the valve stem is drawn outwardly through the hole 24 and positioned centrally within the provided opening. Thus, it is possible to exert a substantial downward force upon the outer free end of the valve stem 21 during the application of the air supply hose or conduit without disturbing the position of the valve stem. After inflating the tire, the holder tool can be removed from the valve stem and stored for future use, while a conventional threaded valve stem cap may be applied to the open outer end of the valve stem in a conventional manner.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

An inner tube valve positioning tool comprising, in combination, a substantially rigid cylindrical main base member having a central longitudinal and internally threaded bore extending axially longitudinally therethrough, a pair of generally V-shaped members each integral with diametrically opposite sides of said cylindrical main base member, each said V-shaped member being symmetrically arranged with respect to said rigid base member and with the other one of said V-shaped members, each one of said V-shaped members including a pair of inwardly converging arms defining a central apex portion at said diametrically opposite sides of said cylindrical main base member, the apex portion of each one of said members being connected to said main base member in facing engagement with each other, the outer free ends of each pair of arms defining plane surfaces lying in parallel spaced apart planes, and said plane surfaces of said arms being parallel to said main base member and perpendicular to the axis of the bore in said main base member.

References Cited in the file of this patent

UNITED STATES PATENTS

| | | |
|---|---|---|
| 721,608 | Ruggles et al. | Feb. 24, 1903 |
| 963,042 | Gamon | July 5, 1910 |
| 1,071,986 | Cupper | Sept. 2, 1913 |
| 2,250,787 | Anderson | July 29, 1941 |
| 2,663,212 | Henszey | Dec. 22, 1953 |